United States Patent [19]

Zeppenfeld et al.

[11] Patent Number: 5,169,527

[45] Date of Patent: Dec. 8, 1992

[54] LIQUID EXTRACTING DEVICE AND ASSOCIATED METHOD

[75] Inventors: Reiner Zeppenfeld, Allison Park, Pa.; Walter Roediger, Hanau, Fed. Rep. of Germany

[73] Assignee: Roediger Pittsburgh, Inc., Allison Park, Pa.

[21] Appl. No.: 600,263

[22] Filed: Oct. 22, 1990

Related U.S. Application Data

[63] Continuation of Ser. No. 178,716, Apr. 7, 1988, abandoned.

[51] Int. Cl.$^5$ ............................................. B01D 33/04
[52] U.S. Cl. .................................... 210/247; 210/400
[58] Field of Search ............... 210/356, 400, 780, 783, 210/247

[56] References Cited

U.S. PATENT DOCUMENTS

| | | | |
|---|---|---|---|
| 4,079,524 | 3/1978 | Amicel et al. | 34/9 X |
| 4,270,279 | 6/1981 | Roediger | 34/9 |
| 4,404,099 | 9/1983 | Austin | 210/247 X |
| 4,475,453 | 10/1984 | Davis | 210/400 X |
| 4,543,880 | 10/1985 | Svensson | 210/400 X |
| 4,557,833 | 12/1985 | Krenmayr et al. | 210/400 X |

OTHER PUBLICATIONS

Product brochure entitled "Dewatering Equipment".
Product brochure entitled "Introducing the Tower Press", Oct. 1987.
Brochure of sales for Klein GmbH Country—Germany, titled Fruitpress.

*Primary Examiner*—Frank Spear
*Attorney, Agent, or Firm*—Ansel M. Schwartz

[57] ABSTRACT

Two porous belts and a plurality of rollers are provided for removing liquid from sludge. The sludge is positioned between the two belts and moved under compression over the rollers thereby causing the liquid to be discharged from the sludge and into a catch basin below. The rollers are relatively positioned to form an upwardly projected undulating contour thereby defining an area under each of substantially all rollers for the placement of liquid deflectors under each roller. An associated method provides steps for positioning sludge between two belts, moving the sludge in compression over rollers to remove liquid from the sludge and deflecting the extracted liquid from a portion of the belts.

3 Claims, 3 Drawing Sheets

LIQUID EXTRACTING DEVICE AND ASSOCIATED METHOD

This is a continuation of copending application Ser. No. 07/178,716 filed on Apr. 7, 1988, now abandoned.

BACKGROUND OF THE INVENTION

1. Field of the Invention

The present invention relates to apparatus and a method for removing liquid from sludge and, more particularly, to an apparatus and method for removing liquid from sludge that prevents the liquid extracted from the sludge from being reabsorbed by the sludge as it travels through the apparatus.

2. Description of the Prior Art

Machines that remove liquid from sludge in the process of disposing of the sludge have existed for some time. One machine is manufactured and marketed by the assignee of the present application under the name "Roediger Belt Filter Press" (hereinafter referred to as the "BFP"). The BFP employs dual belts that are designed to support sludge and move it through the BFP over a series of rollers. The belts are maintained under tension and cooperate with the rollers to compress the sludge and extract liquid from it. Although the BFP is highly effective in removing liquid from sludge, it suffers from the problem that the roller placement allows extracted water to be deposited on portions of the belts which are not in contact with the roller and, therefore, are not compressing the sludge. The extracted liquid is reabsorbed by sludge which was already partially deliquified, negating, to an extent, the deliquification which already had occurred.

To avoid the problem described above, the positioning of the rollers of the preferred embodiment of the present invention allows deflectors to be mounted below each roller to deflect extracted liquid from uncompressed sludge. The roller positioning, preferably, causes the belts to follow a generally vertically projecting undulating pattern, although other arrangements are equally functional. Such deflector placement is not possible with existing sludge deliquification machines due to the positioning of the rollers in those machines.

SUMMARY OF THE INVENTION

The present invention provides apparatus for extracting liquid from a mixture of solid and liquid matter including a conveying system that moves the matter through the apparatus along a predetermined path, extractors located along the path that extract liquid from the matter at extraction areas, and deflectors that deflect substantially all extracted liquid from matter travelling along said path outside the extraction areas.

The present invention further provides apparatus for extracting liquid from a mixture of solid and liquid matter which includes a frame, a plurality of rollers each rotatable about its center longitudinal axis and rotatably attached to the frame for extracting liquid from the mixture of solid and liquid matter, belt apparatus with a portion in moveable pressure contact with the rollers and a portion out of contact with the rollers for supporting the mixture of solid and liquid matter and deflectors which are relatively positioned with the rollers and the belt apparatus for substantially deflecting the liquid extracted from the mixture of solid and liquid matter away from the portion of the belt apparatus which is out of contact with the rollers. Each roller is relatively positioned with each other roller to form a path along which the belt apparatus follows with the belt apparatus positioned along the path to form a vertically projecting undulating contour with one roller being positioned adjacent each horizontal extremity of the vertically projecting undulating contour.

Also provided is a method of extracting liquid from a mixture of solid and liquid matter which includes providing apparatus generally of the type described above, supporting the mixture of solid and liquid matter by the belt apparatus, moving the belt apparatus along the path, extracting liquid from the mixture of solid and liquid matter and substantially deflecting the liquid extracted from the mixture of solid and liquid matter away from the portion of the belt apparatus which is out of contact with the rollers.

Additionally provided is apparatus for extracting liquid from a mixture of solid and liquid matter which includes a frame, a plurality of relatively positioned rollers, each rotatable about is longitudinal axis and rotatively attached to the frame. Also provided is a conveying belt system with a portion in moveable pressure contact with the rollers and a portion out of contact with the rollers for supporting the mixture of solid and liquid matter and a plurality of deflection devices relatively positioned with the rollers and the belt for substantially deflecting the liquid extracted from the mixture of solid and liquid matter away from the portion of the belt which is out of contact with the rollers. The relative position of the rollers defines an area below each of substantially all of the rollers with at least one deflection device relatively positioned with respect to the rollers in each area.

BRIEF DESCRIPTION OF THE DRAWINGS

The following detailed description of the preferred embodiment can be understood better if reference is made to the accompanying drawings in which.

DETAILED DESCRIPTION OF THE PREFERRED EMBODIMENT

Figure 1:
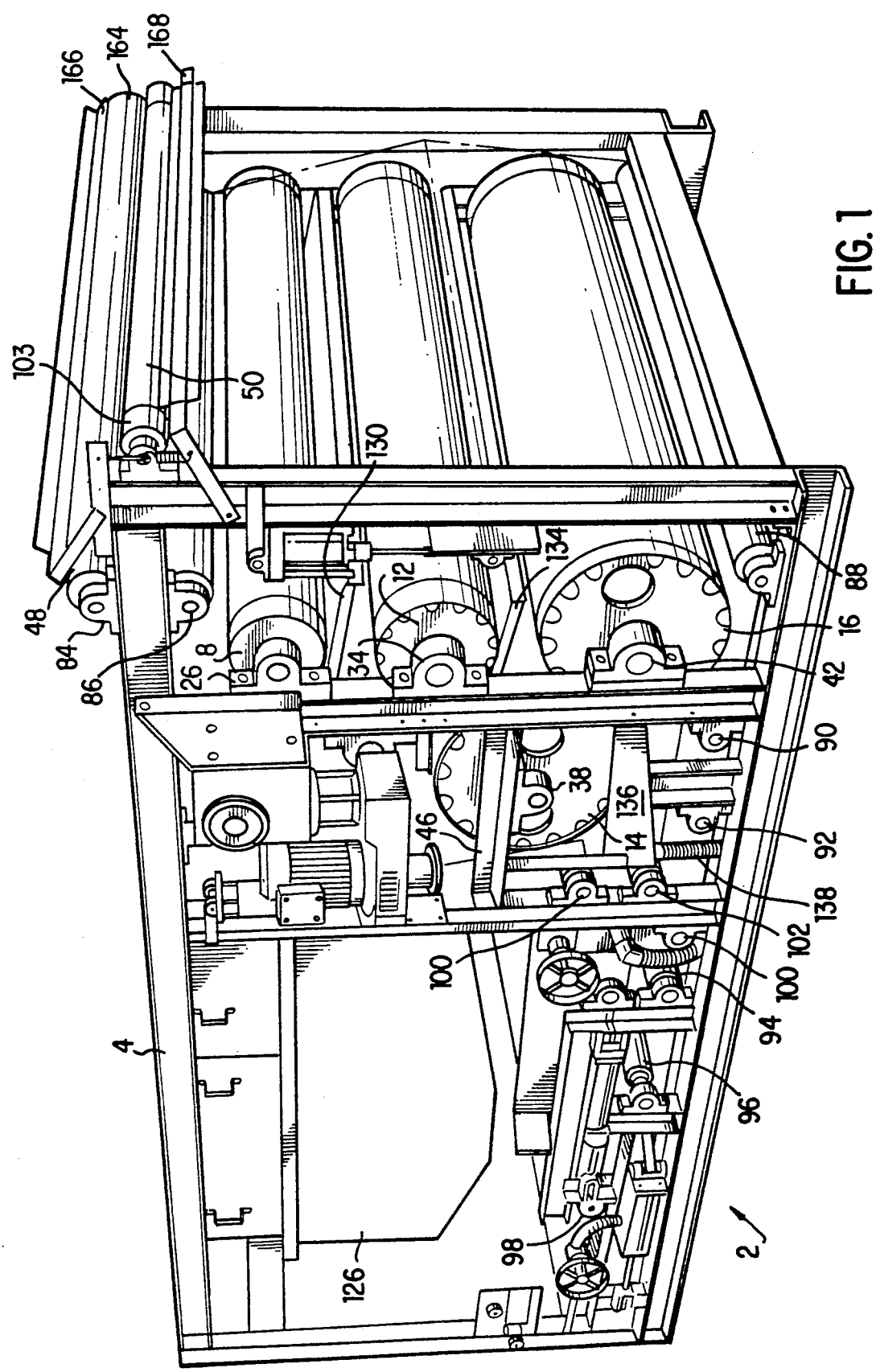
FIG. 1 is a perspective view of the present invention.
Figure 2:
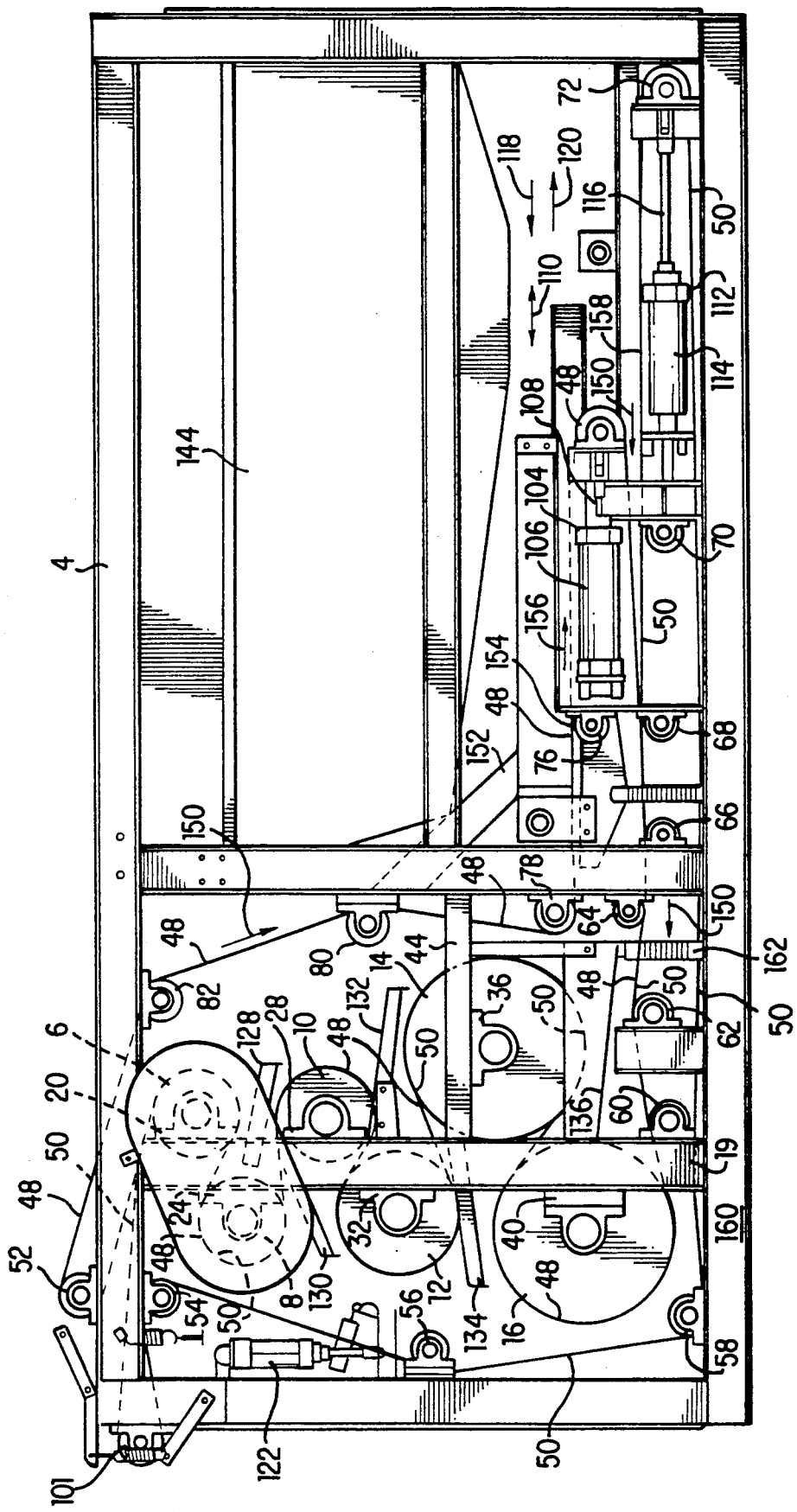
FIG. 2 is a side elevational view of the apparatus shown in FIG. 1.

FIGS. 1 and 2 show liquid extractor 2. Liquid extractor 2 includes frame 4 which supports the major components of liquid extractor 2. Rollers 6, 8, 10, 12, 14 and 16 are rotatably secured to supporting structure 18 and 19 of frame 4 by conventional means. Roller 6 is secured to supporting structure 19 by bracket 20 and to supporting structure 18 by bracket 22. Roller 8 is secured to supporting structure 19 by bracket 24 and to supporting structure 18 by bracket 26. Roller 10 is secured to supporting structure 19 by bracket 28 and to supporting structure 18 by bracket 30. Roller 12 is secured to supporting structure 19 by bracket 32 and to supporting structure 18 by bracket 34.

Roller 14 is secured to supporting angle 44 by bracket 36 and to supporting angle 46 by bracket 38. Roller 16 is secured to supporting structure 19 by bracket 40 and to supporting structure 18 by bracket 42. The use and function of brackets 20, 22, 24, 26, 28, 30, 32, 34, 36, 38, 40 and 42 are well known to those of ordinary skill in the art.

Guide wheels 52, 54, 56, 58, 60, 62, 64, 66, 68, 70, 72, 74, 76, 78, 80, 82, 84, 86, 88, 90, 92, 94, 96, 98, 100, 101, 102 and 103 guide belts 48 and 50 along their paths of travel through liquid extractor 2. Belt tensioner 104 includes hydraulic cylinder 106 and piston 108 which adjusts the position of guide wheel 74 in the directions shown by arrow 110. Similarly, belt tensioner 112 includes cylinder 114 and piston 112 for adjusting the position of guide wheel 72 in the directions shown by arrow 110. By moving guide wheels 72 and 74 in the direction shown by direction arrow 118, belts 48 and 50 are reduced in tension, while moving guide wheels 72 and 74 in the direction of arrow 120 increases the tension of belts 48 and 50.

Steering apparatus 122 and 124 are provided to ensure that belts 48 and 50 do not move laterally from their desired path. The function and operation of steering means 122 and 124 are well known to those of ordinary skill in the art. As is shown in FIG. 1, rotating sludge preparation zone 126 is a standard piece of equipment whose function and operation are well known to those of ordinary skill in the art and does not form any part of the present invention. Although the addition of rotating sludge preparation zone 126 is optional, it is shown in conjunction with the present invention for purposes of clarity and to demonstrate the versatility of the present invention.

Figure 3:
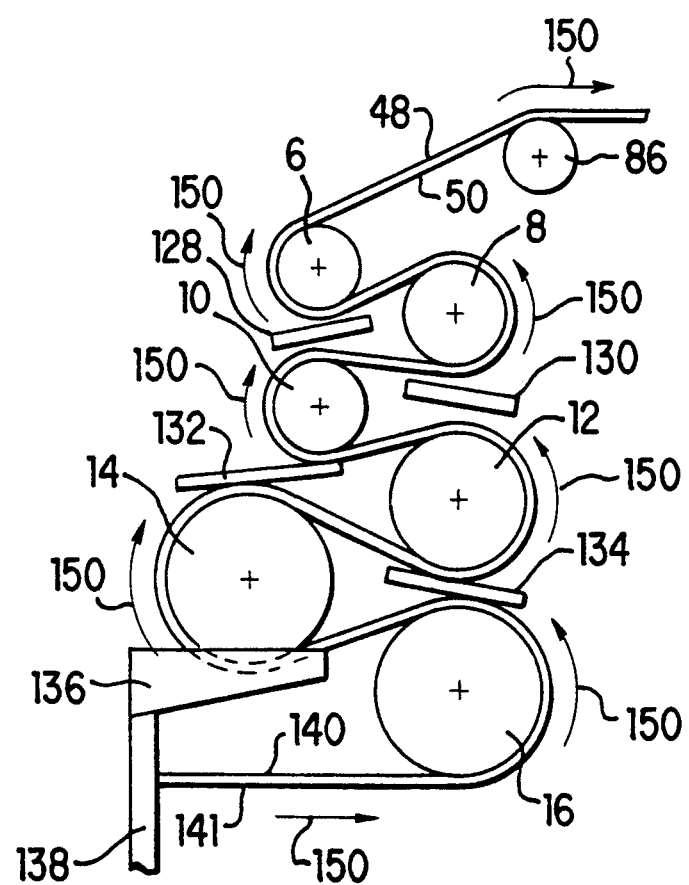
FIG. 3 is a schematic view of the rollers and deflectors of the apparatus shown in FIG. 1.

As is shown in FIG. 3, rollers 6, 8, 10, 12, 14 and 16 and belts 48 and 50 cause sludge to follow a generally vertical undulating path as it travels through extractor 7. As is shown in FIGS. 1 through 3, deflectors 128, 130, 132, 134 and 136 are positioned below rollers 6, 8, 10, 12, and 14, respectively. It is the placement of the rollers that allows at least one deflector to be positioned below each roller. Deflector 136 defines an associated drain 138 through which liquid extracted by roller 14 flows, to prevent liquid from spilling onto belt portions 140 and 141 of belts 48 and 50, respectively.

In use, a mixture of solid and liquid matter, such as sludge, is introduced into rotating sludge preparation zone 126 for initial deliquification. Rotating sludge preparation zone 126 is operated by motor 146 through gear box 148. Motor 146 and gear box 148 also move belts 48 and 50 in the direction shown by arrows 150. The mechanical connections between gear box 148 and rotating sludge preparation zone 126 and belts 48 and 50 are well known to those of ordinary skill in the art.

After initially processing the sludge in rotating sludge preparation zone 126, the partially deliquified sludge is discharged through chute 152 onto belt portion 154 of belt 48. Belt 48 carries the sludge in the direction of arrow 156 and the sludge falls on belt portion 158 of belt 50. As the sludge passes under guide wheel 74 on belt 50, compression of the sludge between belts 48 and 50 commences. Because of the tension on belts 48 and 50, belt 50 presses the sludge against belt 48 as it travels around roller 16 causing some of the liquid to be released from the sludge and fall into catch basin 160. The pressure on the sludge is lessened as it travels between rollers 16 and 14.

The sludge is carried by belts 48 and 50 to roller 14, where it becomes compressed against belt 50 and roller 14 by pressure exerted by belt 48. Further deliquification of the sludge occurs as the sludge passes around roller 14 and the extracted liquid falls onto deflector 136, through drain 162 and into catch basin 160. Without deflector 136, the liquid discharged as the sludge travels around wheel 14 would fall on the sludge contained between belts 48 and 50 as it travels between guide wheels 60 and 64. Since the sludge, traveling between guide wheels 60 and 64, is not under compression, it would partially absorb any liquid falling on it.

When the sludge reaches roller 12, additional liquid is extracted from the sludge as belt 50 compresses the sludge against roller 12 and belt 48. Roller 12 has a smaller diameter than rollers 14 and 16, and, thus, greater compressive force is exerted on the sludge as it travels around roller 12, since the force exerted by belt 50 is distributed over a smaller area. Thus, additional liquid is extracted from the sludge, which is discharged onto deflector 134. Deflector 134 prevents the liquid from falling on uncompressed sludge contained between belts 48 and 50 as it travels between rollers 14 and 16.

After the liquid that was extracted when the sludge travelled around wheel 12 falls onto deflector 134, it is discharged from deflector 134 onto the portion of belt 50 travelling around roller 16. However, since the sludge contained between belts 48 and 50 is compressed when traveling around roller 16, that sludge will not absorb the liquid discharged from deflector 134 and, therefore, the liquid will roll off the surface of belt 50 into catch basin 160.

In a similar manner, the sludge proceeds around roller 10, where it is compressed against belt 50 and roller 10 by belt 48. Since roller 10 is of an even smaller diameter than roller 12, additional liquid will be extracted, which will fall onto deflector 132. This liquid will fall from deflector 132 onto the portion of belt 48 travelling around roller 14 and into catch basin 160. Deflector 132 prevents liquid discharged as sludge is travelling around roller 10 from reaching the uncompressed sludge travelling between rollers 12 and 14.

The sludge travels around roller 8 where additional liquid is extracted and falls onto deflector 130. The sludge proceeds around roller 6 where liquid is extracted and falls onto deflector 128.

After travelling around roller 6, belts 48 and 50 separate, causing the deliquified sludge to be released from discharge area 164. Scrapers 166 and 168 prevent the deliquified sludge from travelling past discharge area 164 and reentering liquid extractor 2. A convenient receptacle (not shown) may be positioned below scraper 168 to collect the deliquified sludge.

An important feature of the claimed invention is the unique positioning of rollers 6, 8, 10, 12, 14 and 16, which causes belts 48 and 50, and sludge, to travel in a generally vertically projecting undulating path and defines an area below each of substantially all of the rollers for the placement of at least one deflector. By so positioning the rollers in this deflectors 128, 130, 132, 134 and 136 may be conveniently positioned below rollers 6, 8, 10, 12, 14 and 16, respectively, thereby deflecting extracted liquid away from those portions of belts 48 and 50 which are not compressing the sludge.

The positioning of the rollers in other liquid extracting devices makes it at least difficult, if not impossible, to properly position deflectors under each roller. The absence of deflectors allows liquid to fall onto and be absorbed by sludge that is already partially deliquified, and that is not being compressed. Although the reliquified sludge would be further deliquified as it travels through the machine, such additional redeliquifying is inefficient, thereby resulting in higher operational cost and less total liquid extraction. The present invention eliminates the counterproductive problems associated with such existing liquid extractors.

The associated method of deliquifying sludge includes providing apparatus, generally of the type described above, moving the belt and contained sludge through liquid extractor 2, and causing the sludge to become deliquified. The liquid extracted from the sludge is then substantially deflected from those portions of the belt not in contact with a roller and under compression.

Whereas particular embodiments of the invention have been described above for purposes of illustration, it will be evident to those skilled in the art that numerous variations of the details may be made without departing from the invention as defined in the appended claims.

What is claimed is:

1. An apparatus for extracting liquid from a mixture of solid and liquid matter comprising:

a single stationary frame having a base and a first and second vertical supporting member, each of which extend perpendicularly from said base, said first and second supporting members in parallel and defining a vertical plane that is perpendicular to the base;

a plurality of rollers, each rotatable about its longitudinal axis and rotatably attached at each end to said first and second supporting members, respectively, so that the rollers are disposed in a fixed relationship to each other and all ends have either the first or second supporting member as common such that there is at least one roller having its longitudinal axis on each side of the vertical plane and each roller has a different vertical position with respect to the base, said supporting members disposed essentially perpendicular to the longitudinal axis of each roller and along the vertical plane, said rollers having progressively decreasing diameters the higher their vertical position;

a conveying belt means with a portion in movable pressure contact with said rollers and a portion out of contact with said rollers for supporting the mixture of solid and liquid matter;

a plurality of deflectors, at least one disposed beneath each roller, each of said deflectors deflecting liquid falling from rollers above the deflector from reaching portions of the belt means between the rollers below the deflector, said deflectors connected to said frame out of contact with the rollers; and each of said rollers being relatively positioned such that the pressure on the mixture is lessened as it travels between the rollers, and to form a path along which said belt means follows, with said belt means positioned along said path to form a generally vertically projecting undulating contour with one said roller being positioned adjacent each horizontal extremity of said vertically projecting undulating contour and with each roller rotatably attached at each end to said respective supporting members such that the belt means path crosses the vertical plane each time it passes from one roller to the next.

2. An apparatus as described in claim 1 wherein each roller has a bottom and a top, and the top of each roller is above the bottom of the roller to which the belt means path immediately passes so liquid extracted from a given roller is not able to flow to the roller from which the belt means path came.

3. An apparatus as described in claim 2 wherein there are at least 3 rollers.

* * * * *

UNITED STATES PATENT AND TRADEMARK OFFICE
CERTIFICATE OF CORRECTION

PATENT NO. : 5,169,527
DATED : December 8, 1992
INVENTOR(S) : Reiner Zeppenfeld, et al

It is certified that error appears in the above-indentified patent and that said Letters Patent is hereby corrected as shown below:

```
In the abstract, line 8, after "all" insert -- of the -- .
Column 1, line 47, after "provides" insert -- an -- .
Column 2, line 9, before "apparatus" insert -- the -- .
Column 4, line 52, after "this" insert -- manner, -- .
Column 6, line 19, replace "said roller" with -- of said rollers -- .
Column 2, line 20, change "is" to -- its -- .
```

Signed and Sealed this

Twenty-third Day of November, 1993

Attest:

BRUCE LEHMAN

Attesting Officer

Commissioner of Patents and Trademarks